Aug. 11, 1959 E. V. LAVOIE 2,898,982
AUTOMOBILE WINDOW SCREEN
Filed Dec. 22, 1958 2 Sheets-Sheet 1
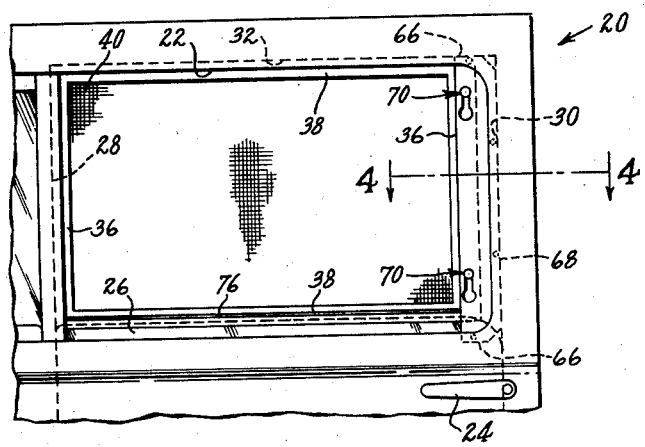
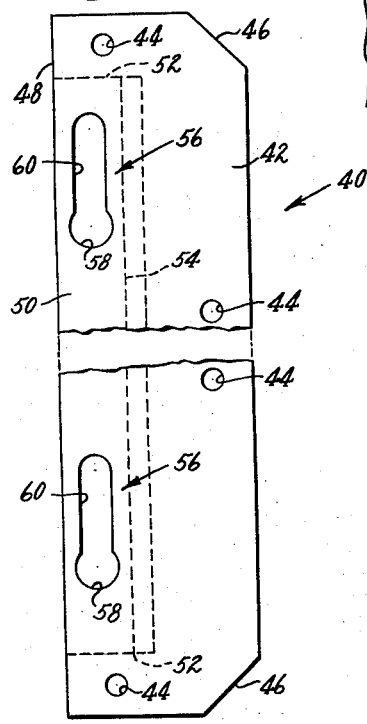
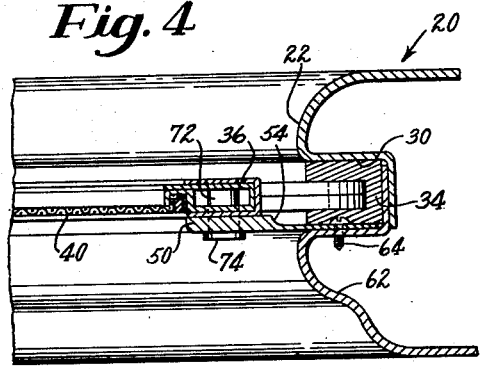
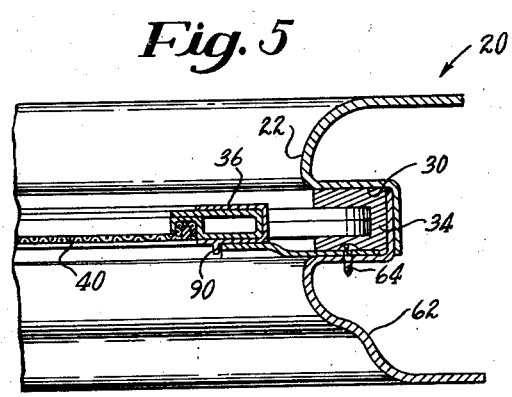
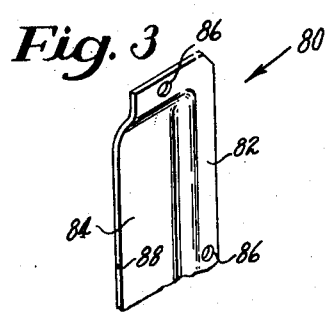
INVENTOR
Edward V. Lavoie
By his Attorney

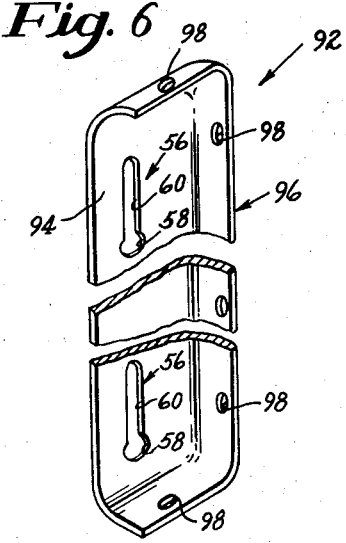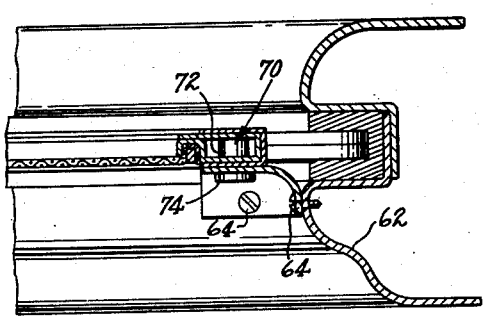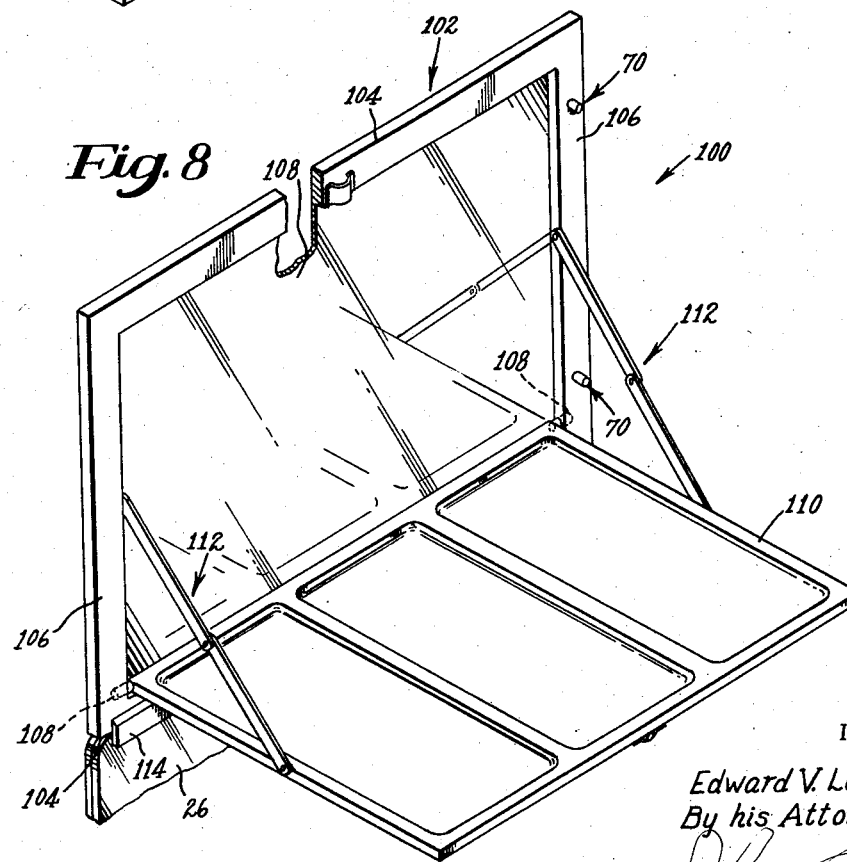

United States Patent Office 2,898,982
Patented Aug. 11, 1959

2,898,982

AUTOMOBILE WINDOW SCREEN

Edward V. Lavoie, Beverly, Mass.

Application December 22, 1958, Serial No. 782,299

3 Claims. (Cl. 160—40)

This invention relates to window opening closure means, and more particularly to window screens for automobiles.

The modern day automobile is being used more and more for purposes other than just a means of transportation. That is, that present day vehicle provides convenient and private seating at the popular drive-in theaters, and those vehicles equipped with seats which are easily convertible into beds provide means for outdoor sleeping while on camping or extended trips. However, it has been found that when the vehicles are used as aforementioned and are not moving that the windows of the vehicle must be maintained closed or else multitudes of insects invade the interior of the car and make the occupants therein extremely uncomfortable. And, to maintain the vehicle windows in a closed position during the summer months is virtually impossible since the interior of the automobile quickly gets unbearably hot and uncomfortable to the passengers therein. Of course, it is impractical to operate the air conditioning system of those cars so equipped, since during a stationary condition, the air conditioner presents an extremely heavy draw on the electrical system of the vehicle.

The present invention is directed to a novel means of providing unique window opening closures which permit the admission of fresh air and yet completely and effectively exclude the undesirable insects. This invention is a novel rigid window screen that fits firmly into the window closure to provide an effective barrier to insects. Further, the rigid window screen of the present novel invention is so designed and constructed that it also provides an effective barrier to unauthorized entry into the vehicle while people may be sleeping therein.

Window screens have heretofore been known in the art, and are generally, of two types; namely, (1) a rigid type that was fixedly secured to the motor vehicle frame and not easily removable, and (2) a flexible type of screen that could be easily distorted to snap into the window frame channels. Generally speaking, the flexible type window screen comprised a screen mounted upon a frame of some flexible material, such as, plastic. It is necessary to have a flexible framing since the frame is slightly larger than the normal window opening and has to be distorted to fit within the window tracks. Afterwards, the frame springs back to its original shape and allegedly wedges in the opening of the window. An apparent disadvantage to this type of window closure is that parent disadvantage to this type of window closure is that ultimately the frame member will become distorted and prevent an effective barrier to insect life. In addition, the flexible frame type window screen can be distorted easily by an intruder who wished to gain admission to the vehicle.

The present novel invention is directed to a rigid frame window screen that is efficiently and easily mounted within the window opening, is easily removed when desired, provides an effective insect barrier, and further effectively prevents unauthorized admission to the automobile.

It is, therefore, a primary object of the present invention to provide novel closure means for openings.

Another object of the present novel invention is to provide novel closure means for vehicle openings.

Yet a further object of the present novel invention is to provide a novel screen for the window openings of automobiles.

Still another object of the present novel invention is to provide a rigid frame window screen for automobile window openings.

Another object of the present novel invention is to provide an easily mountable and removable rigid frame window screen for automobiles which provides an effective barrier to insect life and prevents unauthorized entry into the vehicle.

An additional object of the present novel invention is to provide a novel adaptor mounted on the frame of a window of a vehicle which facilitates the easy mounting and removal of a rigid frame window screen for automobiles.

A further object of the present novel invention is to provide a rigid window screen and adaptor for automobile window openings that is inexpensively manufactured and easily assembled and disassembled in the window of the vehicle.

These and other objects will become more apparent from the following detailed description and claims when read in conjunction with the attached drawings, wherein:

Figure 1 is a fragmentary elevational view of the door of an automobile showing the rigid window screen and adaptor mounted thereon;

Figure 2 is a fragmentary elevational view, partially broken away, of a preferred embodiment of the novel rigid adaptor for the window screen of the present novel invention;

Figure 3 is a fragmentary perspective view of another form of novel adaptor;

Figure 4 is a fragmentary sectional view, taken along the line 4—4 of Figure 1, showing the method of mounting the screen on the novel adaptor of Figure 2, and further showing the method of attaching the adaptor to the door frame;

Figure 5 is a fragmentary sectional view similar to that of Figure 4 but showing the method of mounting the screen on the modified adaptor shown in Figure 3;

Figure 6 is a fragmentary perspective view, partially broken away, of a further modified form of adaptor capable of being externally mounted on the window door frame;

Figure 7 is a fragmentary sectional view, similar to Figures 4 and 5, showing a method of attachment of the window screen to the adaptor shown in Figure 6, and further showing the method of mounting the adaptor on the exterior window frame, and Figure 8 discloses a novel window frame mounted utility kit having a tray and mirror.

Turning now to the drawings and more particularly to Figure 1, the details of the novel rigid frame window opening closure and adaptor will now be particularly described.

As was heretofore noted the present novel invention is directed to a rigid frame window opening closure device, and a novel adaptor member easily secured at one side to the window frame opening. With the device of the present novel invention, a window screen or other rigid frame type of mechanism can be easily mounted within the window opening without distortion of the frame member, nor can the frame or closure member be easily removed therefrom by unauthorized persons, and further, the closure once mounted in the window opening always provides an effective barrier to insect life.

As shown in Figure 1 the numeral 20 generally designates an automobile door having a window opening portion designated by the numeral 22, and a door handle 24. As is usual in automobile door construction there is mounted in the door a window 26 that is slidably movable up and down between open and closed positions. At its side the window is guided by well known guide tracks 28 and 30 and in its undermost position the upper end of the window fits within upper recessed track 32 to thereby form a complete closure of the opening 22. As clearly seen in Figure 4, the guide track 30, and also the guide track 28, are provided with a felt like member 34 to prevent window rattling and also to provide a more effective weatherproof mounting for the window 26.

As clearly seen in Figure 1 the window screen of the present novel invention comprises a rigid frame portion defined by side members 36 and upper and lower frame members 38 which essentially define a rectangle somewhat smaller in dimensional size than window opening 22. Rigidly mounted in frame members 36 and 38 is the usual type of mesh screen 40. The frame members 36 and 38 are preferably formed from extruded aluminum thus providing a material that is not subject to rust or corrosion; similarly the mesh screen 40 can also be formed of the same non-corrosive material.

Turning now to Figure 2, a detailed description of the preferred form of novel adaptor will now be particularly described. The novel adaptor is generally designated by the numeral 40 and comprises an essentially rectangular aluminum sheet member 42 provided at its upper, lower and right hand marginal edges with openings or apertures 44. The right hand upper and lower corners indicated by the numeral 46 are beveled for clearance purposes which will be hereinafter explained. Extending inwardly, or to the right, from the left hand marginal edge 48 of member 40 is a thickened portion 50 which terminates at its upper and lower marginal edges 52 inwardly spaced from upper and lower apertures 44. The right hand or innermost edge of thickened portion 50 is beveled or gently curved as indicated by numeral 54. Intermediately disposed between the longitudinal marginal edges of thickened portion 50 are a pair of aligned openings generally designated 56, which comprise essentially circular openings 58 which intersect with longitudinal somewhat narrower slot openings 60 to form a pair of keyhole type mounting slots.

As clearly seen in Figure 4 and Figure 1, the adaptor member 40 is mounted between the felt member 34 and the outermost portion of the window opening frame, designated 62, and is fixedly secured to this portion of the frame by means of screws 64 passing through openings 44 and into appropriate openings in frame portion 62. Attention is called to Figure 1 wherein it is seen that the adaptor 40 extends upwardly and downwardly into the recess formed by the frame member 62 and as indicated by the numeral 66, and also extends to the right in the adjacent window track as indicated by the numeral 68.

The right hand frame member 36 of screen 40 is provided with a pair of engaging members or pins generally designated 70 and comprising a cylindrical body portion 72, and a somewhat enlarged cylindrical head portion 74. The diameter of head portion 74 of pin 70 is slightly smaller than openings 58 of keyhole slots 56 so that the heads of pin 70 can slide through openings 58 in the well known manner.

The screen 40 with is frame members 36 and 38 are mounted in the window opening 22 as shown in Figure 1. When the screen is first mounted the window 26 is wholly retracted, and the left hand frame member 36, as viewed in Figure 1, fits within track 28. The lower frame member 38 fits downwardly into the lower window track sufficiently so that head 74 of pins 70 can be aligned with circular openings 58 of key hole slot 56. Once the heads of pins 74 are passed through openings 58 the window is then raised partially as shown in Figure 1. The raising of the window forces the frame members and consequently the screen 40 upwardly in window opening 22 so that upper frame member 38 fits completely into upper track 32 and the barrel or body portion 72 of pins 70 slides upwardly in slots 60. The window which abuts lower frame member 38 is elevated sufficiently so that the screen is rigidly retained in track 32, 28, and slots 60, as clearly seen in Figure 1. The lower frame member 38 can be formed with either a groove or an external portion so that the joint between lower frame member 38 and the upper edge of window 26 is overlapped by a portion of frame member 38 to prevent an open joint at that portion, as indicated by the numeral 76.

Thus it can be readily appreciated from the foregoing that the novel screen is rigidly secured within the window tracks, heretofore described, and the slot 60 of keyhole slots 56, and that as such this novel window screen is irremovable by unauthorized persons from the exterior of the vehicle. Thus, there is herein provided a novel, simple and inexpensive window screen for automobiles, thereby providing further and greater enjoyment of the vehicle at drive-in movies and on camping trips.

Turning now to Figures 3 and 5, a further embodiment of the novel invention will be now described, like numerals indicating like parts.

In the embodiment shown in Figures 3 and 5, there is basically one fundamental difference, that is, the adaptor member 80 is not provided with keyhole slots, and on the contrary is provided with no slots. Adaptor member 80 is essentially the same construction as that of adaptor member 40, having a body portion 82 and a mounting portion 84 and mounting apertures 86. Mounting portion 84 is inwardly dished or curved to properly locate the mounting portion 84 with respect to screen 40, as clearly seen in Figure 5. The left hand end or edge 88 of adaptor member 80 is smooth and straight as clearly seen in Figure 3. The adaptor member 80 shown in Figure 3 is mounted in frame portion 62 of door 20 by means of screws 64 in the same manner that adaptor 40 was mounted and described in connection with Figure 4. As clearly seen in Figure 5, the right hand frame member 36 of screen 40 is provided with a transversely extending flange 90 which is in abutting engagement with the left hand edge 88 of adaptor member 80. In this embodiment the screen is again mounted within track 28 and rests on the top of window 26 with the flange 90 in abutting engagement with edge 88. Once the screen is so mounted that window 26 is elevated to wedge the rigid frame between the top of window 26 and and at the top of track 32. Laterally the frame is also wedged in track 28 and by virtue of the abutting engagement of flange 90 and edge 88 of adaptor 80. Thus it can be seen that there is also herein provided a further novel means of mounting a rigid window screen in the window of a vehicle.

Turning now to Figures 6 and 7, a further novel form of adaptor and method of mounting the rigid window screen will now be particularly described. As clearly seen in Figure 6 there is a further form of adaptor generally designated 92 and comprising a thin sheet metal body portion 94 having a right angularly or transversely extending continuous flange at its upper, lower, and right hand marginal edges as clearly seen in Figure 6, the flange being generally indicated by the numeral 96. Spaced along flange 96 are mounting aperture openings 98, as clearly seen in Figure 6. Adaptor member 92 is provided with openings 58 and slots 60 defining keyhole slots 56, as described in connection with the adaptor member 40 shown in Figure 2. Turning now to Figure 7 it will be seen that by virtue of the outwardly extending flange 96 the adaptor member 92 can be mounted from the external side of window portion 62 by means of screws 64 passing into the molding 62 of door 20. Once the adaptor 92 is mounted on door portion 62 with flange 96 abutting the adjacent door molding the head 74 of pins 70 are passed through openings 58 and the window 26 is then moved to an up position sliding pins 70 upwardly in slot 60 in the same manner as that described in connection with Figures 2 and 4.

It will be readily appreciated from the foregoing that there is herein provided a novel rigid screen for the opening of automobile vehicle windows and a unique adaptor for mounting that rigid screen in the said opening. By means of this novel rigid screen and adaptor it is possible to use a rigid framed screen, and not to depend on the distortion of a flexible frame member to mount the screen within the window opening. The advantages from such a system are multitudinous, and it is obvious that since there is no distortion of the screen frame that the screen will always present an effective barrier to insect life, and further the rigid frame screen, so novelly mounted, also prevents unauthorized entry of the vehicle from the exterior. Further, it will be readily appreciated from the foregoing that the novel rigid frame screen and adaptor herein disclosed can be easily and inexpensively manufactured from non-rusting, non-corrosive extruded aluminum and easily and inexpensively mounted on any vehicle window with a minimum of expense or trouble.

Turning now to Figure 8, a description of a further use of the novel adaptor will now be described. As clearly seen in Figure 8 there is generally indicated a novel kit member generally indicated 100 and comprising a rigid frame member generally designated 102 and comprising upper and lower rigid frame members 104 and rigid side frame members 106. Mounted intermediate these frame members is a metallic or glass mirrored surface generally designated 108. The right hand frame member 106 as viewed in Figure 8 is also provided with mounting pins 70, the function of which has heretofore been described. Pivotally mounted as by means of pivots 108 is a tray member 110 formed of a sheet of noncorrosive metal which can serve as a dining tray, cosmetic tray or general toilet kit. Tray member 110 is fixedly pivotally connected to the lateral or side frame members 106 as by means of pivotally interconnected linkage members generally designated 112. In its closed position member 110 fits wholly within the internal boundaries of frame members 104 and 106 which define a depression, so that the overall thickness of kit 100 is the same as the thickness of screen unit 40. Also mounted along the lower frame member 104 is an overlapping member 114 which overlies the joint between the lower edge of frame member 104 and window 26 to form an effective seal or barrier for the crack therebetween, as heretofore described. The novel kit member 100 disclosed and herein described in Figure 8 is mounted in the window openings 22 in the same manner as the rigid window screen is mounted as heretofore described. Thus it is readily appreciated with the novel adaptor herein disclosed and the rigid frame construction and inexpensive and easily mounted utility kit to serve either as a cosmetic bench or as a dining tray, and can easily be mounted in the window to facilitate and further increase the enjoyment of camping trips and roadway picnics.

Another important feature of the present invention is the novel structure of all forms of the adaptor disclosed herein, which structure permits the adaptors to become an integral part of the vehicle. That is, the adaptors of the present invention can be essentially fixedly secured to the vehicle to become a permanent fixture thereof. These adaptors are attractively designed and can be formed of polished aluminum, or chrome steel or also can be enamelled to match the body paint scheme, thereby completely blending with the color scheme and aesthetic lines of the vehicle to which they are attached.

Further of particular novelty is the fact that these adaptors which are essentially a permanent adjunct to the vehicle in no way interfere with the complete efficient operation of the vehicle windows when the screens are removed.

The invention may be embodied in other forms without departing from the spirit or essential scope or characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a window unit mounted within a vehicle window opening having a vertically movable window and an upper and pair of side tracks for guiding said window, a rigid smooth-edged rectangular frame member of smaller dimensions than said window opening, and slightly lesser thickness than the said tracks; a single rigid adaptor member fixedly mounted at the side of and coextensively with said opening between the upper and lower marginal edges thereof decreasing the size of said opening; fixed engaging means on one side of said frame adjacent to and slidably engaged with said adaptor; said unit mounted in said opening with a lower marginal edge thereof in engagement with the upper edge of said window; said other side of said frame in said side track remote from said adaptor and said engaging means slidably engaged with said adaptor; and said unit slidable in said opening with respect to said side track and adaptor upon movement of said window to closed position, whereby said unit is wedgingly retained between said window and upper track.

2. The device as set forth in claim 1 wherein said adaptor comprises a single rigid metallic plate having an essentially flat inner abutment face; and an outer face of said one side of said frame is mounted in abutting contact throughout the length of said one side with said inner face of said adaptor.

3. The device as set forth in claim 2 wherein said engaging means comprise fixed pins having enlarged heads mounted on and spaced outwardly from the outer face of said one side of said frame member; and vertically disposed bayonet slots along a free marginal edge of said adaptor; said pins mounted in and vertically slidable in said bayonet slots when said window is moved to closed position.

References Cited in the file of this patent

UNITED STATES PATENTS

| | | |
|---|---|---|
| 839,566 | Eliezer | Dec. 25, 1906 |
| 1,127,289 | Sanders | Feb. 2, 1915 |
| 1,608,638 | Weyant | Nov. 30, 1926 |
| 1,619,501 | Evans | Mar. 1, 1927 |
| 1,901,114 | Meiselbach | Mar. 14, 1933 |
| 2,500,703 | Phillips | Mar. 14, 1950 |
| 2,792,881 | Hawley | May 21, 1957 |